US011896102B2

(12) United States Patent
Levi et al.

(10) Patent No.: US 11,896,102 B2
(45) Date of Patent: Feb. 13, 2024

(54) VALVE SYSTEM FOR FORMULA CARTRIDGE

(71) Applicant: L'Oreal, Paris (FR)

(72) Inventors: Damien Levi, Clark, NJ (US); Ji Lee, Jersey City, NJ (US); Nicholas Sinclair, Jersey City, NJ (US); Richard Craig Huff, II, Edmonds, WA (US)

(73) Assignee: L'Oreal, Paris (FR)

(*) Notice: Subject to any disclaimer, the term of this patent is extended or adjusted under 35 U.S.C. 154(b) by 335 days.

(21) Appl. No.: 17/133,110

(22) Filed: Dec. 23, 2020

(65) Prior Publication Data
US 2021/0196021 A1 Jul. 1, 2021

Related U.S. Application Data

(60) Provisional application No. 62/953,689, filed on Dec. 26, 2019.

(51) Int. Cl.
*A45D 19/02* (2006.01)
*F16K 1/36* (2006.01)
(Continued)

(52) U.S. Cl.
CPC ............ *A45D 19/022* (2021.01); *B65B 7/025* (2013.01); *B65B 51/10* (2013.01); *B65D 75/5872* (2013.01); *B65D 77/067* (2013.01); *F16K 1/36* (2013.01); *A45D 19/0066* (2021.01); *B05B 9/0861* (2013.01)

(58) Field of Classification Search
CPC ................ A45D 19/022; A45D 19/026; A45D 19/0066; A45D 24/28; A45D 2034/005; B65D 77/067
See application file for complete search history.

(56) References Cited

U.S. PATENT DOCUMENTS 5,533,708 A * 7/1996 Atkinson ............... F16L 29/005
604/905
5,816,298 A * 10/1998 Stricklin ................. F16L 41/16
141/351
(Continued)

FOREIGN PATENT DOCUMENTS

EP 0415691 A1 3/1991
JP H0385268 A 4/1991
(Continued)

OTHER PUBLICATIONS

International Search Report and Written Opinion dated Apr. 20, 2021, in corresponding International Application No. PCT/US2020/066904 filed Dec. 23, 2020, 15 pages.
(Continued)

*Primary Examiner* — J C Jacyna
(74) *Attorney, Agent, or Firm* — Christensen O'Connor Johnson & Kindness PLLC

(57) ABSTRACT

A valve system comprises: a valve body; a valve cap; and a valve plug between the valve body and valve cap is compressed radially and axially, and a central bore extends wholly through the valve body and valve cap and partially through the valve plug. The valve system is welded to a packet which can contain a hair color formula. One or more of the packets are then used in a cartridge compatible with a dispensing device.

12 Claims, 11 Drawing Sheets

(51) Int. Cl.
*B65D 75/58* (2006.01)
*B65D 77/06* (2006.01)
*B65B 7/02* (2006.01)
*B65B 51/10* (2006.01)
*A45D 19/00* (2006.01)
*B05B 9/08* (2006.01)

(56) References Cited

U.S. PATENT DOCUMENTS

| | | | |
|---|---|---|---|
| 5,967,685 A * | 10/1999 | De Laforcade | B05C 17/0133 401/196 |
| 6,669,060 B2 * | 12/2003 | De Laforcade | B05B 9/0413 222/481.5 |
| 9,828,170 B2 | 11/2017 | Nomura et al. | |
| 2015/0166253 A1 * | 6/2015 | Nomura | B65B 31/003 222/394 |

FOREIGN PATENT DOCUMENTS

| | | |
|---|---|---|
| JP | 10512946 A | 12/1998 |
| WO | 1996/23158 A1 | 8/1996 |
| WO | 1996/023158 A1 | 8/1996 |
| WO | 2013147064 A1 | 10/2013 |

OTHER PUBLICATIONS

International Search Report and Written Opinion dated Apr. 20, 2021, issued in corresponding International Application No. PCT/US2020/066904 filed Dec. 23, 2020 (15 pages).
Indian Examination Report dated Dec. 6, 2022, in corresponding Indian Patent Application No. 202217040147, 5 pages.
Japanese Office Action, dated May 2, 2023, with English Translation, in corresponding Japanese Patent Application No. 2022-539076, 10 pages.
Office Action for counterpart KR Patent App. No. 10-2022-702140, dated Nov. 30, 2023. 7 pages.

* cited by examiner

COMPONENT FOR FILLING

DURING FILLING

AFTER FILLING

VALVE SYSTEM FOR FORMULA CARTRIDGE

CROSS-REFERENCE TO RELATED APPLICATION

This application claims the benefit of U.S. Provisional Application No. 62/953,689, filed Dec. 26, 2019; the content of which is hereby incorporated by reference in its entirety.

SUMMARY

A valve system for a formula cartridge that avoids leakage through multiple uses is disclosed. The formula cartridge with valve system is compatible with and can be inserted into an electronic device which will pump out the formula(s) from the cartridge. The electronic dispensing devices can include one or more of the formula cartridges for dispensing one or more products. Products that can be dispensed include, but are not limited to, hair care products, such as dyes, skin care products, such as lotions and creams, and the like.

In an embodiment, the valve includes a silicone valve plug compressed between a valve body and a valve cap.

In an embodiment, the silicone valve plug is selected from a silicone or silicone copolymer or derivatives thereof.

In an embodiment, the silicone valve plug has a slit dimensioned so as to allow the proper amount of flow at the proper amount of pressure.

In an embodiment, the silicone valve plug has a coating.

In an embodiment, the valve system is provided so as not to leak formula between the time of manufacturing to the time of consumer use.

In an embodiment, the valve system is provided to function properly in the dispensing device once the cartridge is engage with the device (no leak once the cartridge is inserted).

In an embodiment, the valve system is provided to allow proper flow of formula from the cartridge.

In an embodiment, the valve system is provided so as not to leak when the cartridge is disengaged from the device.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
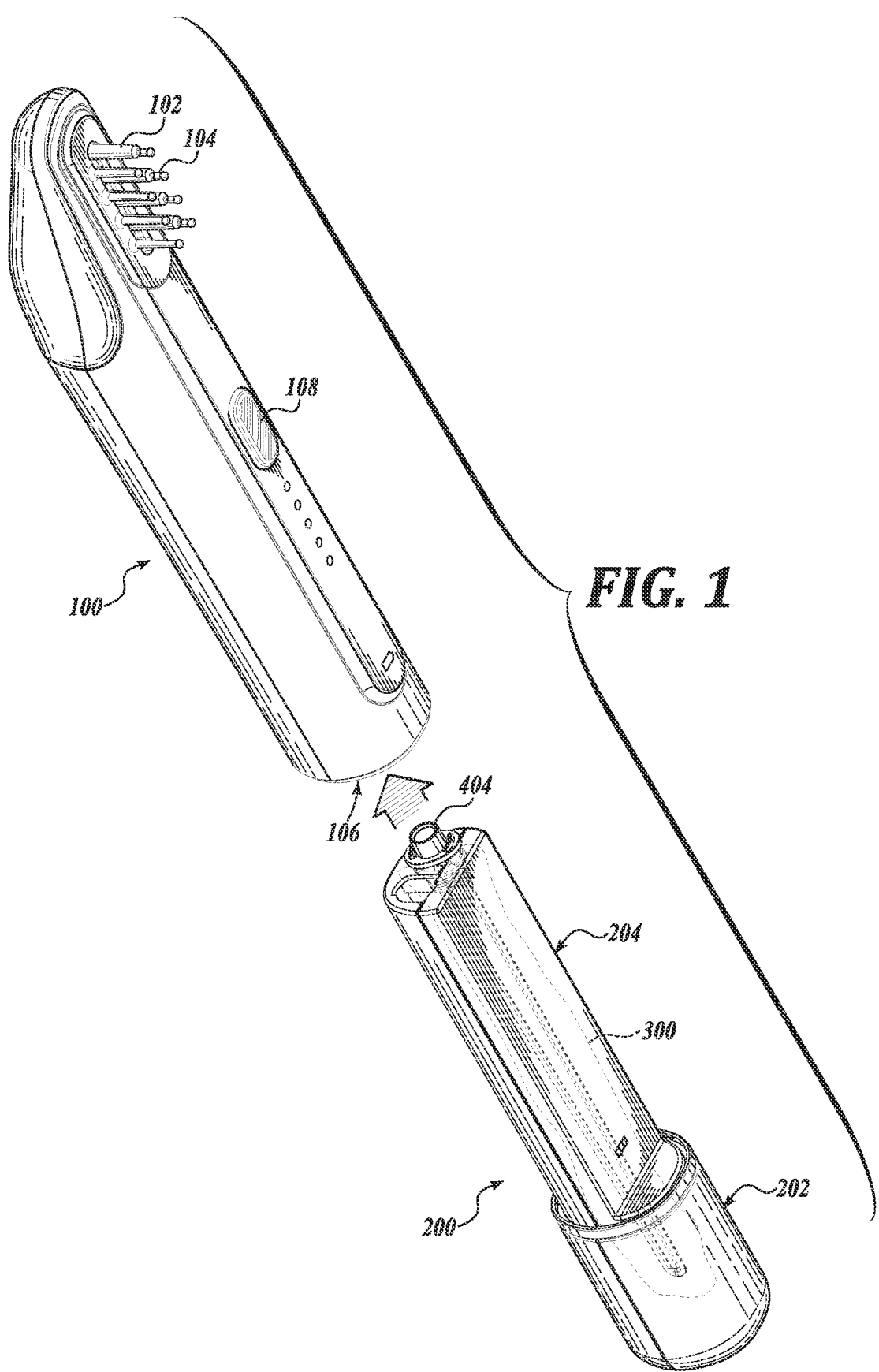
FIG. 1 is a diagrammatical illustration of a dispensing device and a formula cartridge in accordance with an embodiment of this disclosure.
Figure 2:
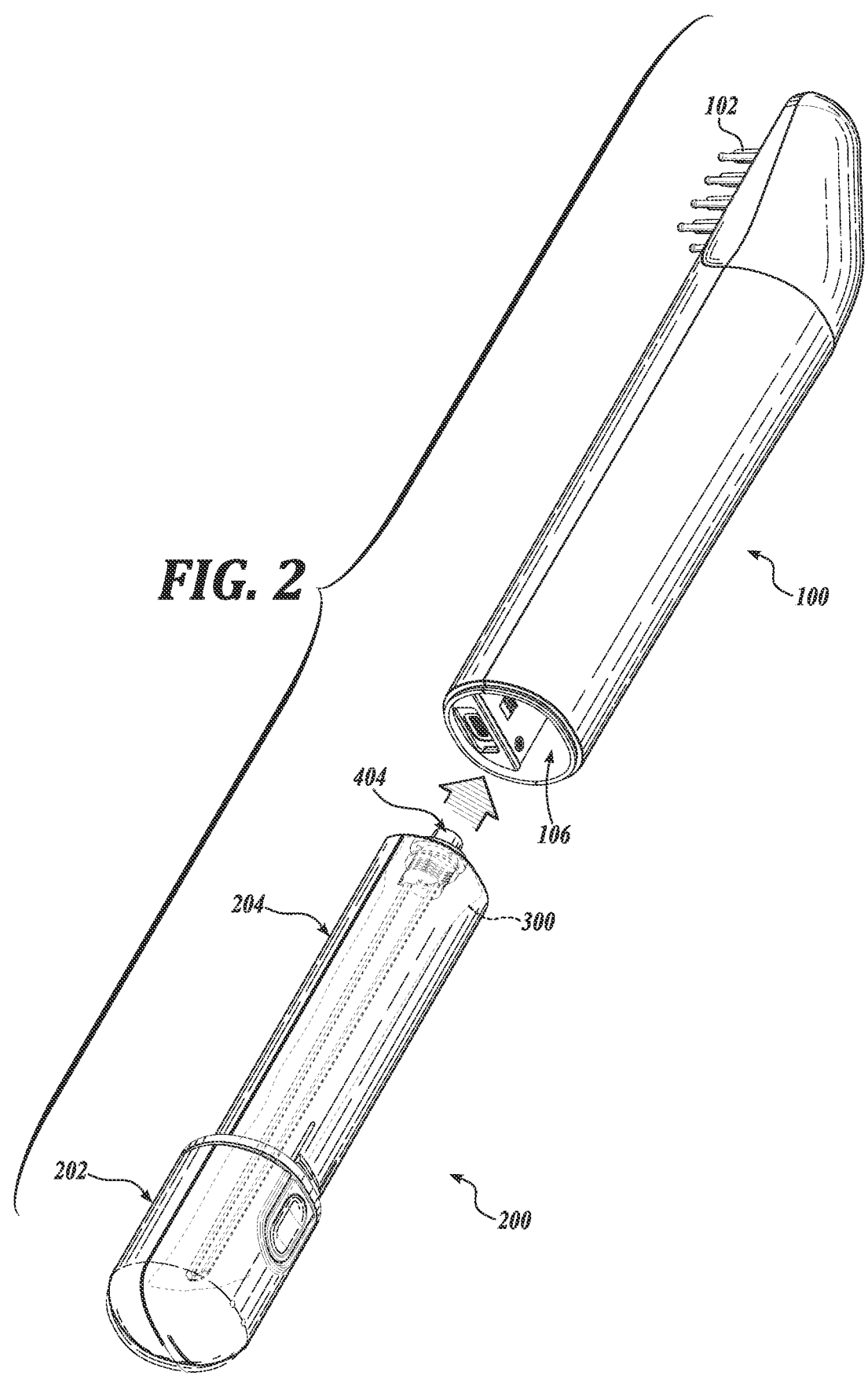
FIG. 2 is a diagrammatical illustration of a dispensing device and a formula cartridge in accordance with an embodiment of this disclosure.

FIGS. 1 and 2 show an illustration of one embodiment of a dispensing device 100 and formula cartridge 200. Although, the valve system of this disclosure is described in the context of the dispensing device 100 and formula cartridge 200 of FIG. 1, the valve system has applications that are not limited solely to dispensing device 100 and formula cartridge 200.

In an embodiment, dispensing device 100 is a hand-held appliance that can be powered by rechargeable or non-rechargeable batteries or household alternating current. In an embodiment, the dispensing device 100 is configured to apply a hair treatment product, such as hair color formula. In an embodiment, when the dispensing device 100 is configured to dispense hair color formula, the dispensing device 100 can include a plurality of flexible bristles 104 adjacent to the formula dispensing bristles 102. In an embodiment, a first and second row of bristles 104 is provided, respectively, along the row of formula dispensing bristles 102 on the right and left sides of the formula dispensing bristles 102. In an embodiment, the bristles 102 and 104 are made from a flexible plastic or elastomer. In an embodiment, formula dispensing bristles 102 include a center bore to allow the passage of formula through the bristles. In an embodiment, the massaging bristles 104 include a ball tip at the distal end. Each row of bristles 104 includes the bristles 104 in a single row along the side of the formula dispensing bristles 102. Furthermore, each bristle 104 is singular, which does not have more than one bristle 104 extending from the same root. Bristles 104 are aligned singularly in either row, and adjacent bristles 104 in the same row are spaced equally. The right and left rows of bristles 104 can coincide in bristle placement, bristle spacing, and bristle height. The formula dispensing bristles 102 can be placed between the spacing of adjacent massaging bristles 104. The height of the bristles 102 and 104 can be uniform, but, does not need to be uniform. The number of massaging bristles 104 and formula dispensing bristles 102 in a row is small, such as 3 to 10, or 3 to 6, or 3 to 4.

In an embodiment, the formula cartridge 200 is insertable into the dispensing device 100. For this purpose, the end 106 of the dispensing device 100 has an opening to allow inserting the formula cartridge 200 so that the majority of the formula cartridge 200 is housed within the dispensing device 100. Formula cartridge 200 is locked into position in the dispensing device 100 by a detent, such as a ramp on a flexible arm. Conversely, the formula cartridge 200 can be released from the dispensing device 100 by depressing the detent.

One or more control buttons 108 will generally be located on the dispensing device 100. In an embodiment, the exterior housing of the dispensing device 100 can be made from rigid materials, such as plastics, metals, or a combination, depending on the intended application. In an embodiment, the power supply, such as rechargeable or non-rechargeable batteries, and motor can be housed within the dispensing device 100. In an embodiment, the motor drives a pump to dispense the formula. In an embodiment, the exterior housing of the formula cartridge 200 can similarly be made from rigid plastics, metals, or a combination, depending to the application. In an embodiment, the formula cartridge 200 is made disposable. In an embodiment, the housing of the formula cartridge 200 is not disposable, but the formula packets housed therein are disposable.

In an embodiment, the exterior housing of the formula cartridge 200 can have any geometric form including regular or irregular forms. In an embodiment, the formula cartridge 200 comprises a cross-section of substantially any geometric shape including circular, triangular, square, rectangular polygonal, regular or irregular shapes, or the like, as well as other symmetrical and asymmetrical shapes, or combinations thereof. In an embodiment, the formula cartridge 200 has a semicircular cross section at semicircular shaped portion 204 for the majority of the length (i.e., the part that is inserted into the dispensing device 100) and a circular cross section at the cylinder shaped portion 202 for the part that remains on the exterior, which is made circular due to the shape of the dispensing device 100.

In the illustrated embodiment, the formula cartridge 200 has a housing with a first cylinder shaped portion 202 and a second semicircular shaped portion 204, wherein the semicircular shaped portion 204 is insertable into the dispensing device 100, while the cylinder shape portion 202 largely remains on the exterior and acts as an extension of the dispensing device 100.

In an embodiment, electrical contacts are made when the formula cartridge 200 is inserted into the dispensing device 100. In an embodiment, the electrical contacts allow the electronics within the formula cartridge 200 to be operated via the buttons 108 on the dispensing device. In an embodiment, when the dispensing device 100 senses that electrical contact has been made with the formula cartridge 200, the motor is enabled to operate.

Figure 3A:
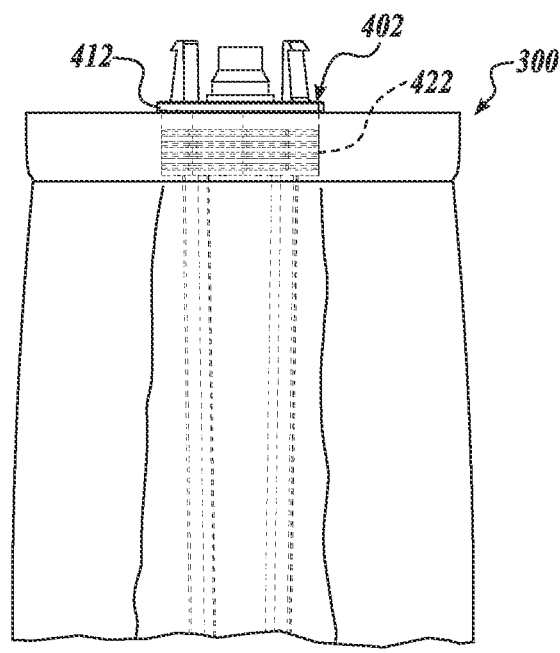
FIG. 3A is a diagrammatical illustration of a packet for use with the formula cartridge of FIGS. 1 and 2 in accordance with an embodiment of this disclosure.
Figure 3B:
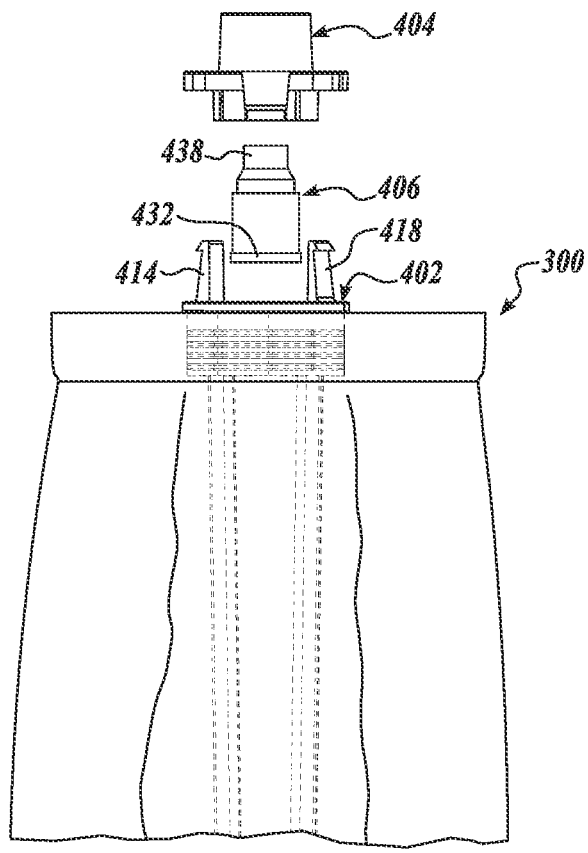
FIG. 3B is a diagrammatical illustration of a packet for use with the formula cartridge of FIGS. 1 and 2 in accordance with an embodiment of this disclosure.
Figure 3C:
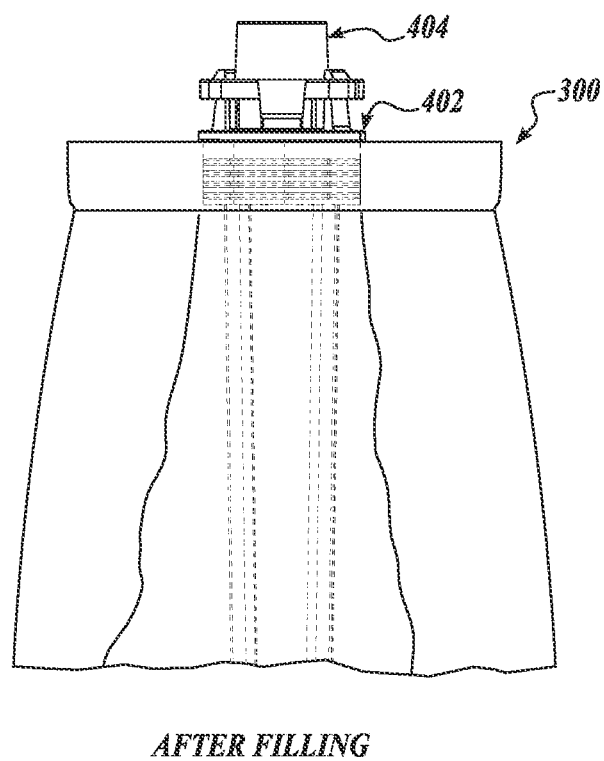
FIG. 3C is a diagrammatical illustration of a packet for use with the formula cartridge of FIGS. 1 and 2 in accordance with an embodiment of this disclosure.
Figure 4:
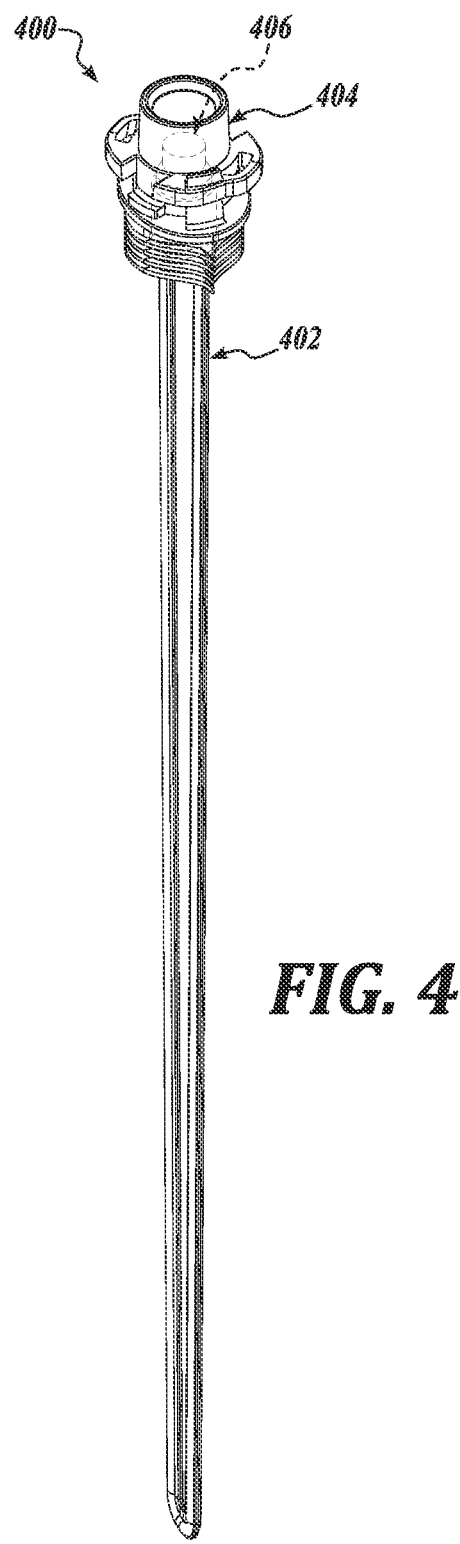
FIG. 4 is a diagrammatical illustration of an assembled valve system in accordance with an embodiment of this disclosure.
Figure 5:
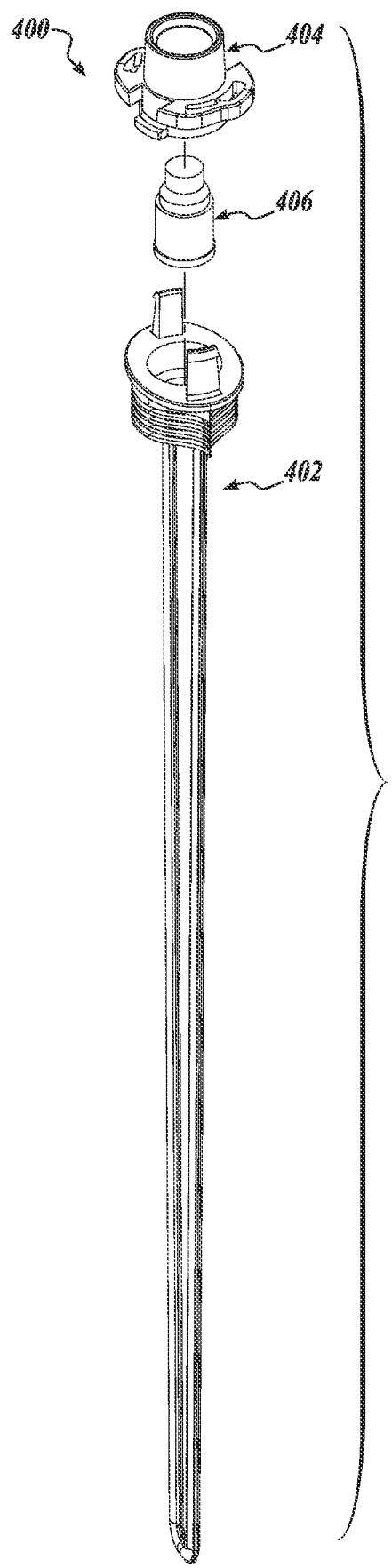
FIG. 5 is a diagrammatical exploded view illustration showing components of the valve system of FIG. 4 for use in the packet of FIGS. 3A, 3B, and 3C in accordance with an embodiment of this disclosure.

FIGS. 3A, 3B, 3C are illustrations of a packet 300 in accordance with an embodiment of this disclosure. One or more of the packets 300 are housed in the formula cartridge 200 as shown in FIGS. 1 and 2. Each of the packets 300 may contain a different formula depending on the application. For example, hair color formulas can include the color formula and developer in separate packets 300. In an embodiment, the developer includes at least hydrogen peroxide or other oxidizing agent. In an embodiment, a packet 300 has a generally rectangular shape dimensioned to fit within the semicircular shaped portion 204 of the formula cartridge 200. The packet 300 can be made from flexible sheet materials that are impermeable and/or chemically resistant or inert to the formulas intended to be contained within. In an embodiment, a packet 300 is made of multiple ply sheets to give the packet impermeability, chemical resistance, and weldability. Metallized sheets and foils, for example, can give the packet 300 impermeability. In an embodiment, the heat-weldable materials to allow welding to two similar sheets or a doubled-over sheet, along the edges to form the packet. Weldable materials allow a heat-welded seal around the valve system.

In an embodiment, the valve system 400 is attached to packet 300 along one of the short dimensioned sides of the packet 300.

The valve system is illustrated in FIGS. 4, 5, 6, 7, 8, and 9. In an embodiment, the valve system 400 includes a valve body 402, a valve cap 404, and a valve plug 406. In an embodiment, the elastomeric valve plug 406 is an elastomer that includes silicone. In an embodiment, the valve plug 406 is coated. In an embodiment, the valve body 402 is made from a monolithic piece of material. In an embodiment, the valve plug 406 is made from a monolithic piece of material. In an embodiment, the valve cap 404 is made from a monolithic piece of material.

In an embodiment, the valve body 402 and valve cap 404 are made from similar materials, such as semi-rigid non-elastomeric plastics, such as polyethylene or copolymers of polyethylene. In an embodiment, the valve body 402 has a central cylindrical section 408 with a central bore extending entirely therethrough. The central cylindrical section 408 has a bottom disk 410 with a hole 460 smaller than the bore of the central cylindrical section 408. Therefore, the valve plug 406 can be supported on the inside of the central cylindrical section 408 by resting on the bottom disk 410, while the hole 460 in the bottom disk 410 allows the formula to pass through the valve system (see FIG. 9).

In an embodiment, the valve body 402 has a flange 412 extending radially and perpendicular to the central axis of the central cylindrical section 408. The flange 412 extends around the upper periphery of the central cylindrical section 408. The flange 412 has an outer periphery that may be defined as elliptical having a long and a short axis in comparison to the circular opening of the valve body 402.

The upper surface of the flange 412 supports one or more connectors or detents. In an embodiment, a first set of barbs 414, 416 is provided on one side on the flange 412 and perpendicular to the flange 412, and a second set of barbs 418, 420 is provided oppositely to the first set of barbs and perpendicular to the flange 412. The barbs 414, 416, 418, 420 are directed away from the flange 412, and the barb or ramp sloping radially outward. Barbs 414, 416, 418, 420 are meant to include the barb section and the stem section. In an embodiment, one barb 414 and 418 of each set is centered on the long axis of the ellipsis, and the second barb 416, 420 (the off-center barb) of the set is placed counterclockwise to the barb 414, 416 that is centered on the long elliptical axis. The sets of barbs 414, 416 and 418, 420 are placed directly opposite from one another and are juxtaposed next to the opening in the valve body 402. Each set of barbs 414, 416, and 418, 420 occupy about less than a quarter of the circumference around the opening of the valve body 402, thereby leaving two opposite spaces adjacent to the circumference. As is described below, one barb (the off-center barb) in each set of barbs is designed to break off after the filling step and the second, remaining barb in the set is used to secure the valve cap 404. In an embodiment, a single barb, such as barb 414 and 418 is placed on each side of the flange 412.

The valve body 402 below the flange 412 has a plurality of fins 422 resembling thin narrow strips that are placed parallel to and below the flange 412. The fins 422 are perpendicular on the exterior of the valve body 402. The fins 422 are placed around the circumference of the valve body 402. The fins 422 are spaced apart from adjacent fins. Wings 424, 426 of solid thin material extend radially and down from the underside of the flange 412 from each end of the long axis on both sides of the flange 412 (FIG. 9), so that the fins 422 taper to a point upon being joined to the wings 424, 426. Thus, the ends of the fins 422 on both sides of the long axis are immobilized by being joined to the wings 424, 426, preventing the ends of the fins 422 from bending, which could develop into a leak point. The fins 422 are for providing a seal to the packet 300.

In an embodiment, a first and second stiffener rod 428, 430 are joined perpendicular to the bottom of the disk 410. The first and second stiffener rod 428, 430 are placed in line with the long axis of the flange 412, but, at opposite sides of the valve body 402. The first and second stiffener rod 428, 430 have a length that can allow placement within the packet 300, and can be joined to each other at the end opposite to the valve body 402 to lend further rigidity. The first and second stiffener rod 428, 430 can have cruciform cross-sectional shape or any shape that adds rigidity. The valve body 402 is positioned on the packet 300 so that the fins 422 are heat-welded between the two sheets at the short dimension of the packet 300, and the flange 412 is protruding just above the short side of the packet 300, and the stiffener rods 428, 430 are within the packet 300.

In an embodiment, the valve plug 406 is made from a silicone or copolymers thereof or their derivatives. The material for the valve plug 406 is an elastomer. In an embodiment, the exterior surface and circumference of the valve plug 406 is coated. In an embodiment, one end of the valve plug 406 is configured to be pierced through to allow dispensing of formula.

Figure 8:
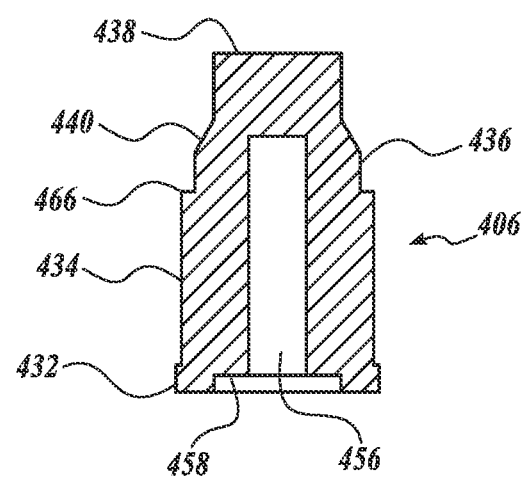
FIG. 8 is a diagrammatical cross-sectional view illustration of the valve plug of the valve system of FIG. 4.
Figure 9:
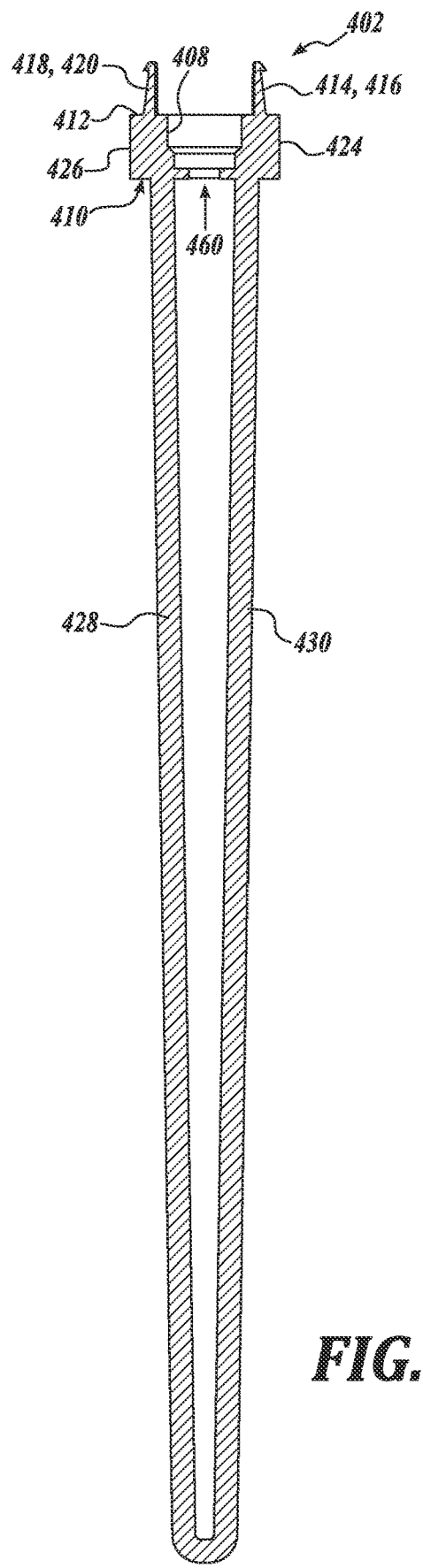
FIG. 9 is a diagrammatical cross-sectional view illustration of the valve body of the valve system of FIG. 4.

Referring to FIG. 8, in an embodiment, the valve plug 406 has a cylindrical shape having four sections of different outer diameters, wherein the largest outer diameter section is at one end of the central axis, and the smallest outer diameter is at the opposite end of the central axis. The largest outer diameter section 432 extends a minimal distance along the central axis. The largest outer diameter section 432 is generally a ring that protrudes outward to act as an anchor within a circular groove on the inside of the valve body 402.

The second largest outer diameter section 434 of the valve plug 406 is juxtaposed after the largest outer diameter section 432. The second largest outer diameter section 434 extends along the central axis of the valve plug 406 sufficient so that the second largest outer diameter section 434 rises only slightly above the top of the flange 412 when placed in the valve body 402, and without being compressed (FIG. 3A). As will be later explained the valve plug 406 is compressed axially between the valve body 402 and the valve cap 404.

The third largest outer diameter section 436 of the valve plug 406 is juxtaposed after the second largest outer diameter section 434 via a sharply defined step 466 or shoulder.

The fourth largest outer diameter section 438, i.e., the smallest outer diameter section of the valve plug 406 is juxtaposed after the third largest outer diameter section 436 via a gradually diminishing conical section 440. The conical transition section 440 between the third largest outer diameter section 436 and the fourth largest outer diameter section 438 can improve sealing between the valve plug 406 and the valve cap 404 through radial compression.

The valve plug 406 has a pre-formed central bore 456 extending at least through the largest 432, second 434, and third 436 largest outer diameter sections. However, the central bore 456 does not extend all the way through the fourth largest outer diameter section 438. Thus, the valve plug 406 is sealed at the end of the fourth largest outer diameter section 438, which initially acts as a seal to prevent leakage. As explained herein, a slit or opening is made in the valve plug 406 to allow the passage of formula when desired, but, prevents leakage when not in use. The slit or opening can be made, for example, when the cartridge 200 is inserted into the dispensing device 100, which can have a hollow needle to pierce the fourth largest outer diameter section 438. Upon pulling the cartridge 200 out from the dispensing device 100, the slit or opening can reclose itself.

In an embodiment, the bottom perpendicular surface to the central axis of the valve plug 406 at the largest outer diameter section 432 can have a groove 458 with a larger diameter than the central bore (FIG. 8), so that better sealing can be achieved between the valve plug 406 and valve body 402 at the largest outer diameter section 432.

Figure 7:
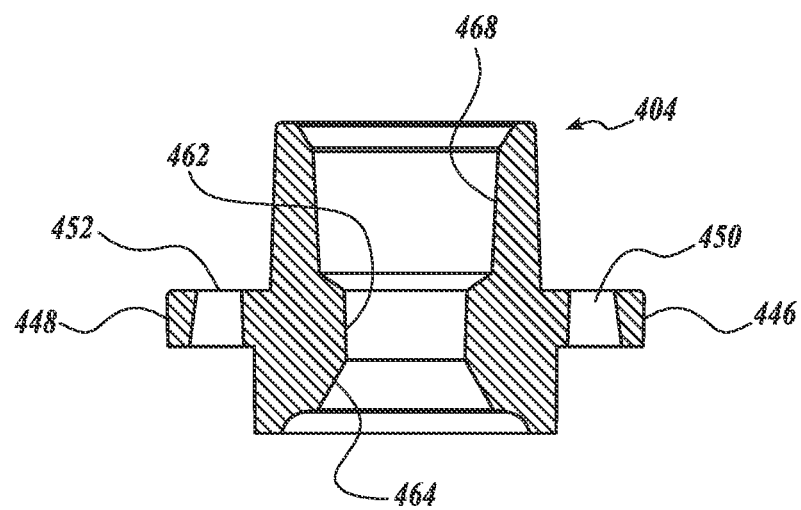
FIG. 7 is a diagrammatical cross-sectional view illustration of the valve cap of the valve system of FIG. 4.

Referring to FIG. 7, the valve cap 404 has a generally cylindrical outer shape with a central bore extending entirely therethrough. The valve cap 404 has a central bore extending throughout the length of the valve cap 404. The valve cap 404 is configured to snap onto the valve body 402 and in the process compress the valve plug 406 inbetween.

The valve plug 406 is positioned in the valve body 402 so that the largest outer diameter section 432 rests on the disk 410 of the valve body 402. The central bore of the valve cap 404 therefore has inner diameter sections to match with the outer diameter sections of the valve plug 406. Namely, the central bore of the valve cap 404 has an inner diameter at 462 slightly smaller than the fourth largest outer diameter section 438, followed by inner diameter 464 to match the conical transition section 440 between the fourth largest outer diameter section 438 and third largest outer diameter section 436. The valve cap 404 does not have an inner diameter to match with the second largest diameter section 434 as it can reside within the valve body 402. The conical section 440 of the valve plug 406 abutting against the corresponding diameter 464 of the valve cap 404 generally acts as a stop to prevent the valve plug 406 from being further inserted into the valve cap 404. The inner diameters of the valve cap 404 can be slightly smaller than the outer dimensions of the valve plug 406 to provide a compression seal both radially and axially between the valve cap 404 and valve plug 406 and between the valve plug 406 and valve body 402.

The inner diameter 468 of the valve cap 404 that is opposite from the valve plug 406 is configured to accept a connector on the dispensing device 100 that leads to the formula dispensing bristles 102.

The valve cap 404 has two oppositely placed dogs 442, 444 (FIG. 6) at the perimeter of the opening which faces the valve body 402, each dog extending perpendicular to the central axis of the valve cap 404. The dogs 442, 444 are for attaching the packet 300 with the assembled valve system to the cartridge 200 housing, such as by a twisting motion that locks the dogs 442, 444, behind the high side of a ramp.

Figure 6:
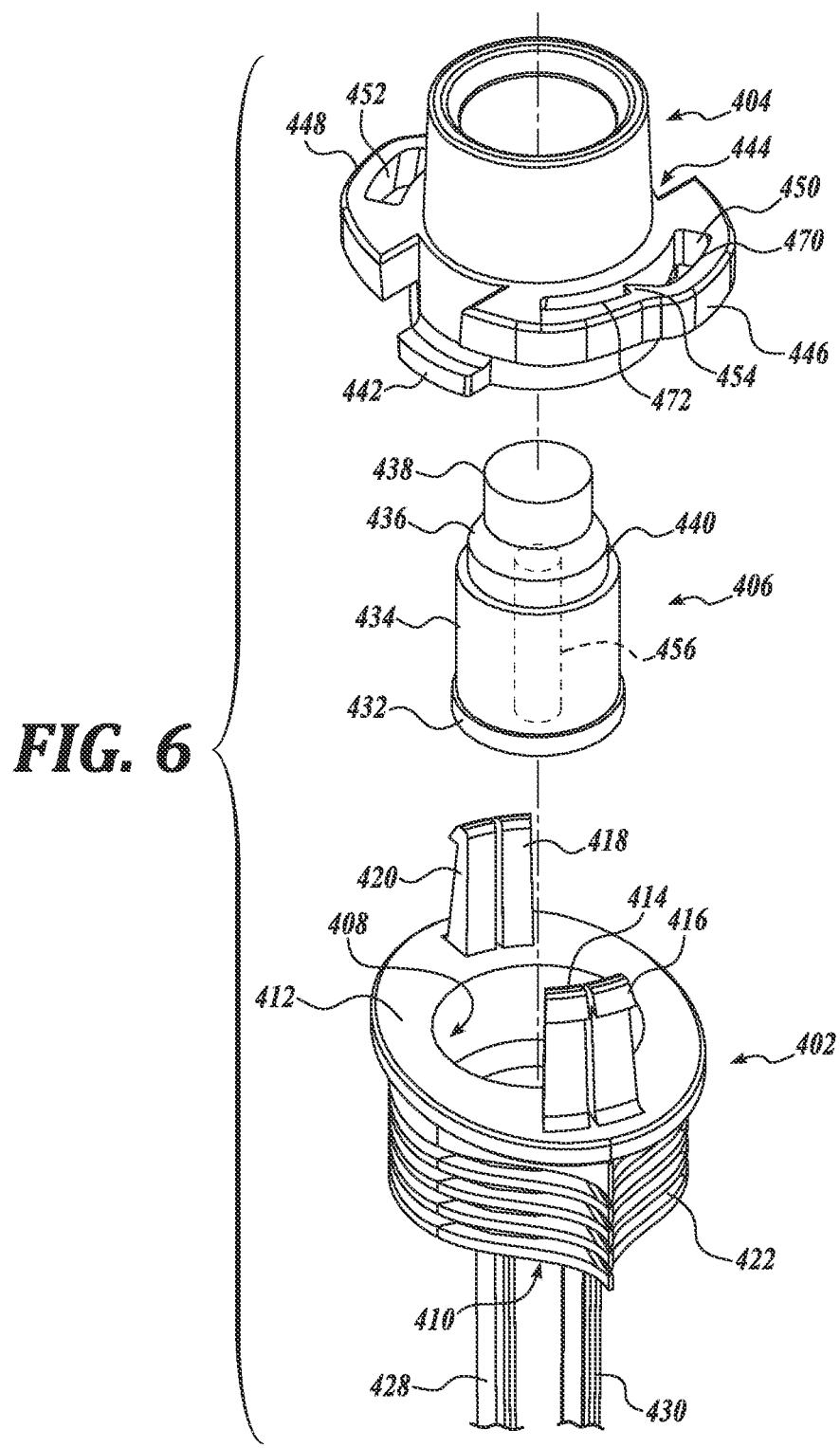
FIG. 6 is a diagrammatical detailed view illustration of the valve system of FIG. 4.

The valve cap 404 has a first and second flange 446, 448 extending radially from the central part, but, only for a section of the circumference. The second flange 448 is placed directly oppositely to the first flange 446. The first and second flange 446, 448 are placed on the exterior circumference of the valve cap 404 about one-third to one-fourth of the length from the end with the dogs 442, 444. The first 446 and second flanges 448 start and stop with respect to the dogs 442, 444, such that the first and second flange 446, 448 occupy the circumference not occupied by the dogs 442, 444, but at a different elevation (FIG. 6). The difference in elevation or space between the upper side of dogs 442, 444, and the bottom side of flanges 446, 448 generally coincides with the thickness of the housing at the top of the cartridge 200. The valve cap 404 is used in attaching the packet 300 to the cartridge 200.

The first and second flanges 446, 448 each have a slot 450, 452, respectively. The slots 450, 452 generally extend with the circumference, but are wholly enclosed by the respective flange on which the slot is located. Each slot 450, 452 has a wide slot section 470 (using slot 450 as example), where wide is in the radial dimension, juxtaposed next to a narrow slot section 472, wherein narrow means in the radial dimension. The length of each slot section in the circumference direction can coincide with the circumference occupied by a single one of the barbs 414, 416, 418, 420 of the valve body 402, as the wide and narrow slot sections are designed to accept one of the barbs 414, 416, 418, 420. A radial barb 454 with a ramp beginning at the wide slot section 470 slopes radially inward and toward the narrow slot section 472 in each flange 446, 448, so that one of the barbs 414, 416, 418, 420 is passed vertically through the wide slot section 470, and then the valve cap 404 is twisted so that the barb on the valve body 402 snaps past the radial barb 454 into the narrow slot section 472. The narrow slot section 472 width in the radial direction can just be large enough to accept the stem of the barb, but not the ramp. Therefore, one of the barbs 414, 416, 418, 420 is secured vertically by resting on one of the flanges 446, 448 and is secured radially by the radial barb 454. If the valve body 402 and valve cap 404 are made from a semi-rigid plastic, such as polyethylene, it is possible to disengage the valve cap 404 from the valve body 402 by twisting in the opposite direction with little or no permanent deformation of the barb.

Referring to FIG. 3A, to make a packet 300, the valve body 402 is first welded to the short side of the packet 300 so that the fins 422 are welded between the two sheets of the packet 300, and the flange 412 protrudes above the edge of the packet 300. Then, a fill spout is attached to the valve body 402 and injected with the predetermined amount of formula. The filling machine can use one the off-center barb 416, 420 to connect the filling spout to the packet 300. Then, when the liquid formula injection is completed, the off-center barbs 416, 420 can be broken off to disconnect the filling machine from the packet 300. Further, once the off-center barbs 416, 420 are broken off, the valve body 402 can be assembled with the valve plug 406 and the valve cap 404. In an embodiment, the flanges 446 and 448 have a wide slot section 470 and a narrow slot section 472 that can accommodate a single barb.

Referring to FIG. 3B, the valve plug 406 is either placed in the valve body 402 with the largest outer diameter section 432 facing the valve body 402 or with the smallest and fourth outer diameter section 438 facing the valve cap 404. With the barbs 416 and 420 being broken off, the remaining two centered barbs 414, 418 can fit vertically into the wide slot sections 470 of flanges 446, 448, and then the valve cap 404 is twisted on the valve body 402 to snap the barbs 414, 418 into the narrow slot section 472 of flanges 446, 448, thus, compressing the valve plug 406 between the valve body 402 and valve cap 404 producing a leak proof seal (FIG. 3C). The assembled valve system now has a central bore opening running wholly through the valve body 402, a portion of the valve plug 406, and wholly through the valve cap 404. In an embodiment, the valve system is prevented from dispensing formula by the smallest fourth outer diameter section 438 of the valve plug 406. Then, the packet 300 is ready to be assembled to the cartridge 200 by placing the packet 300 so that the dogs 442, 444 are beneath the housing of the cartridge 200, while the flanges 446, 448 are above the housing of the cartridge 200. Thus, securing the packet 300 on the cartridge 200.

Upon inserting the cartridge 200 into the dispensing device a hollow needle or a flat hollow needle may pierce the valve plug 406 to allow withdrawing the formula from the packet 300.

While illustrative embodiments have been illustrated and described, it will be appreciated that various changes can be made therein without departing from the spirit and scope of the invention.

The embodiments of the invention in which an exclusive property or privilege is claimed are defined as follows:

1. A valve system, comprising:
 a valve body;
 a valve cap; and
 a valve plug between the valve body and valve cap is compressed radially and axially, and a central bore extends wholly through the valve body and valve cap and partially through the valve plug;
 the valve body further comprises a flange with a first and second barb securing the valve cap to the valve body.

2. The valve system of claim 1, wherein the valve plug is a silicone or silicone copolymer elastomer.

3. The valve system of claim 1, comprising a coating on the exterior of surface the valve plug.

4. The valve system of claim 1, wherein the valve plug comprises more than one section with different outer diameters.

5. The valve system of claim 4, comprising a conical section between the more than one sections with different outer diameters.

6. The valve system of claim 1, wherein the valve body comprises a plurality of fins on the circumference of the valve body.

7. The valve system of claim 1, wherein the valve cap comprises flanges with slots engaged with the first and second barbs.

8. The valve system of claim 6, wherein the flange is elliptical.

9. The valve system of claim 1, wherein the valve body comprises a disk with a hole, and the valve plug is supported on the disk.

10. A packet, comprising:
 one or more sheets welded together to secure the valve system of claim 1 in a weld; and
 a hair color formula in the packet.

11. A cartridge, comprising:
 an exterior housing; and
 the packet of claim 10 secured to the exterior housing through the valve system.

12. The cartridge of claim 11, comprising a first and second packet, wherein the first packet includes a hair color formula and the second packet includes a developer.

* * * * *